Jan. 19, 1960 A. HULIEW 2,921,399
SIGNALING DEVICE FOR FISHING LINES
Filed Sept. 19, 1958
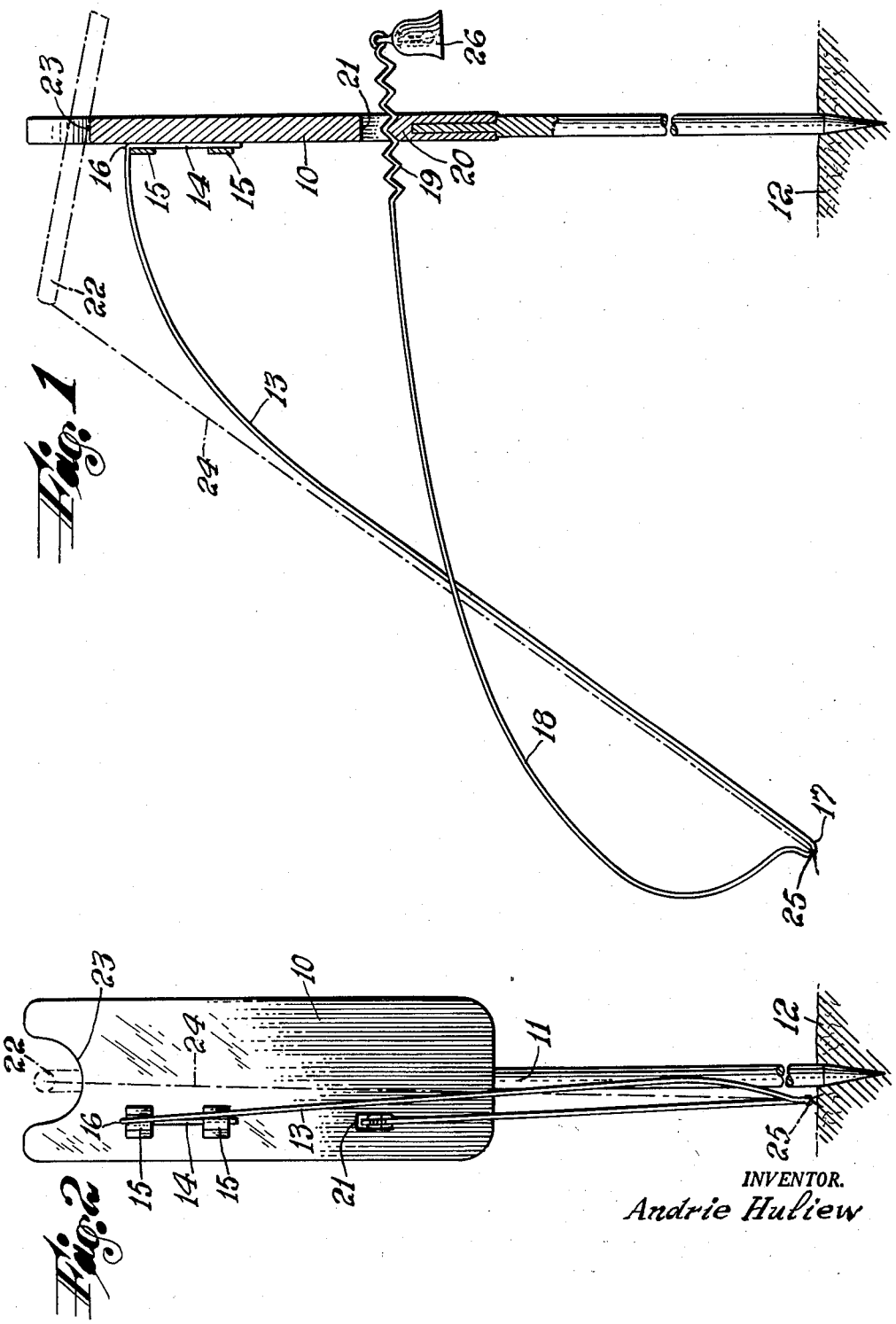
INVENTOR.
Andrie Huliew

United States Patent Office 2,921,399
Patented Jan. 19, 1960

2,921,399

SIGNALING DEVICE FOR FISHING LINES

Andrie Huliew, New Brunswick, N.J.

Application September 19, 1958, Serial No. 761,986

4 Claims. (Cl. 43—17)

This invention relates to signaling devices for fishing lines and is directed particularly to the provision of a signaling device of novel, sturdy, structural features, adapted to be positioned in the ground adjacent the fishing area and to have the fishing line secured thereto, automatically sounding an audible signal alarm when the fish tugs on the line.

In the drawings:

Fig. 1 is a partial sectional view in elevation of a device embodying the invention, taken medially vertically through Fig. 2, and Fig. 2 is a front elevational view thereof.

As shown in the drawings, the device of this invention comprises a plate 10 of any desired or convenient outline and a post 11 secured to and depending from one end of the plate and adapted to be positioned in the ground 12 to support the plate in upright position. A length of wire 13 of spring material is secured at one end 14 to brackets 15 or otherwise secured to the plate 10 and is then bent as at 16 to extend forwardly downwardly of the plate and further bent as at 17 to define a portion 18 extending rearwardly toward the plate. The rearwardly extending portion of the wire is kinked as at 19 and engages a portion 20 of the plate such as the margin of an aperture 21 in the plate, through which the kinked portion extends. The plate is adapted to support the end 22 of a fishing pole whose opposite end may be positioned on the ground or might be held by the fisherman. The device is especially adapted to enable one end of the pole to be simply positioned on the ground, the other end of the pole being supported by the plate 10 or a recessed portion 23 of the plate. The line 24 extending from the pole 22 is secured as at 25 to the spring wire 13 so that when a fish tugs on the line, pulling the wire string 13, the kinked portion of the wire string 13 will engage the plate, and will vibrate; a vibration sensitive audible signal device, such as a bell 26, secured to the wire string, will then sound the signal.

Having thus described my invention, what I claim as new and desire to secure by Letters Patent is:

1. A signaling device for indicating the hooking of a fish on a line comprising a plate, a post depending from one end of the plate adapted to be positioned in the ground for supporting the plate in upright position so that a fishing pole end may be positioned on the plate and supported thereby, with the fishing line extending from the pole forwardly of the plate, a wire of spring material secured at one end to the plate and extending forwardly therefrom so that the fishing line may be secured thereto, said wire spring being extended rearwardly toward the plate, said plate having an aperture therethrough, said extended portion of the wire spring extending through the aperture and having kinks formed in the portion thereof extended through the aperture, so that, when a fish tugs on the line, the wire spring will be pulled and the kinked portion of the wire spring thereby will engage the apertured portion of the plate and the wire spring will vibrate, and a vibration sensitive audible signal device secured to the wire spring to sound an alarm when the wire spring is vibrated.

2. In a fishing line signaling device as set forth in claim 1, said plate having a recessed portion in which the fishing pole may be so positioned.

3. A signaling device for indicating the hooking of a fish on a line comprising a plate, a post depending from one end of the plate and adapted to be positioned in the ground for supporting the plate in upright position so that a fishing pole end may be positioned on the plate and supported thereby, with the fishing line extending from the pole forwardly of the plate, a wire of spring material secured at one end to the plate and extending forwardly downwardly therefrom so that the fishing line may be secured thereto, said wire spring being extended rearwardly toward the plate, said rearwardly extending portion of the wire spring being kinked and positioned in engagement with the plate so that when a fish tugs on the line, the wire spring will be pulled and the kinked portion will engage the plate and the wire spring will vibrate, and a vibration sensitive audible signal device secured to the wire spring in such a manner as to sound an alarm when the wire spring is vibrated.

4. A signaling device for indicating the hooking of a fish on a line comprising a plate, a post depending from one end of the plate adapted to be positioned in the ground for supporting the plate in upright position so that a fishing pole end may be positioned on the plate and supported thereby, with the fishing line extending from the pole forwardly of the plate, a wire of spring material secured at one end of the plate and extending forwardly therefrom so that the fishing line may be secured thereto, said wire spring being extended rearwardly toward the plate, said plate having an aperture therethrough, said extended portion of the wire spring extending through the aperture and a vibration sensitive audible signal device secured to the wire spring in such a manner as to sound an alarm when the wire spring is moved.

References Cited in the file of this patent

UNITED STATES PATENTS

| 2,526,980 | Turchan | Oct. 24, 1950 |
| 2,801,488 | Sokolik | Aug. 6, 1957 |